3,600,299
MULTIZONE HYDROCRACKING PROCESS
James C. Koller, Chicago, Ill., assignor to Standard Oil
Company, Chicago, Ill.
Filed Nov. 15, 1968, Ser. No. 776,018
Int. Cl. C10g 23/00
U.S. Cl. 208—89                                    12 Claims

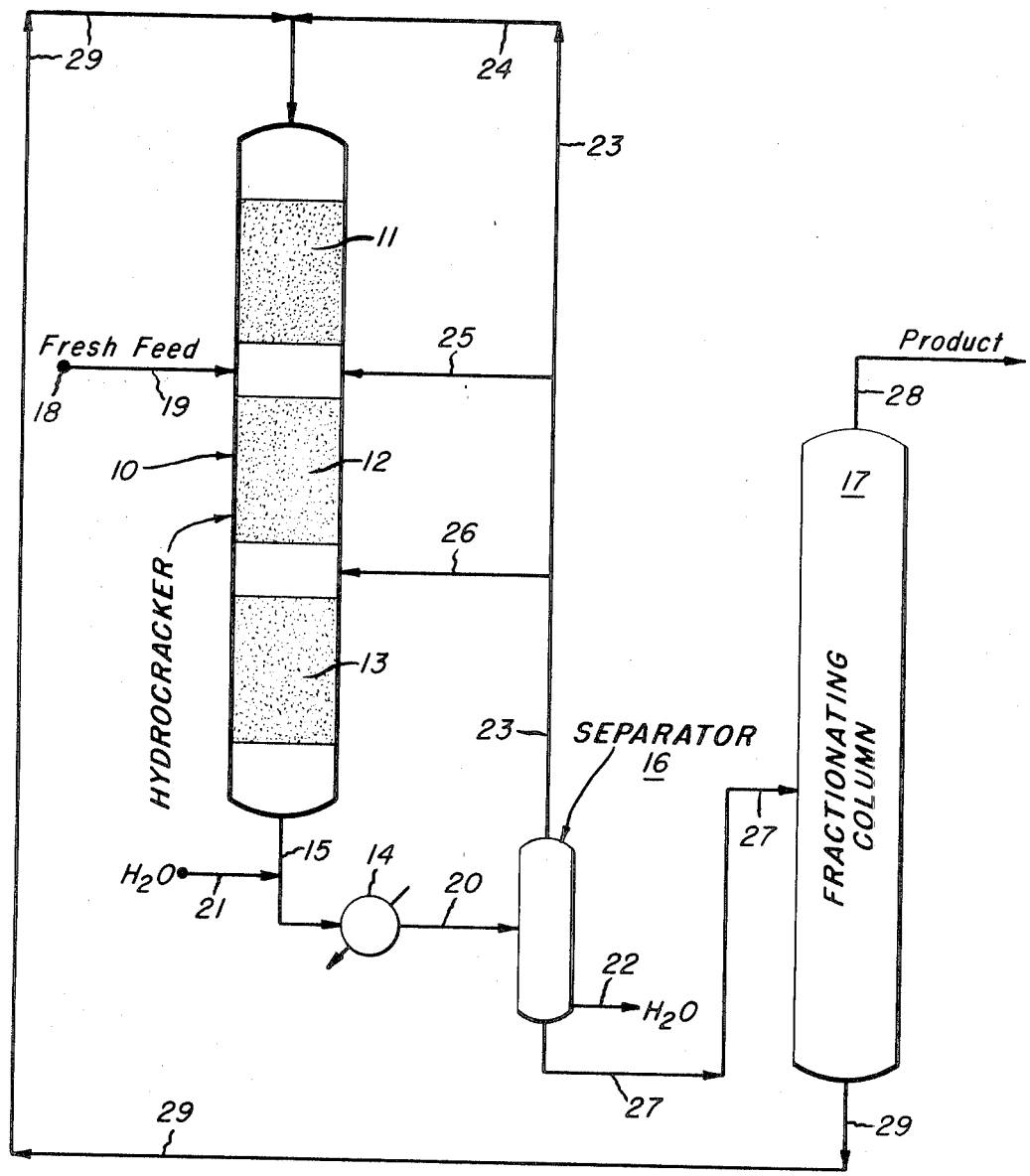

ABSTRACT OF THE DISCLOSURE

A multizone hydrocracking process in which the first catalytic zone comprises a conventional acid-type hydrocracking catalyst, the second catalytic zone comprises a denitrogenation catalyst and the third catalytic zone comprises a molecular sieve-type hydrocracking catalyst. The fresh feed, including both hydrocarbon and hydrogen, is introduced into the second zone where the hydrocarbon is denitrogenated and sent to the third zone where the hydrocarbon is partially hydrocracked. Liquid product from the third zone is divided into a high boiling fraction and a low boiling fraction, and the high boiling fraction is recycled to the first zone for further hydrocracking. The effluent from the first zone continues on and is mixed with the fresh feed in the second zone. Gaseous effluent from the third zone is recycled to the first, second and/or third zones where it provides necessary hydrogen gas and aids in controlling catalyst temperatures. The low boiling liquid fraction is recovered as product.

BACKGROUND OF THE INVENTION

This invention relates to the catalytic conversion of hydrocarbons at elevated temperatures and in the presence of hydrogen gas such that hydrocracking takes place. More specifically, it relates to an improved hydrocracking process using multiple catalytic zones to optimize the product selectivity and hydrocarbon feed conversion. In recent years much effort has been devoted to finding ways of improving hydrocracking processes. Earlier processes generally involved the use of an acid-type hydrocracking catalyst such as molybdenum oxide and either cobalt oxide or nickel oxide dispersed on a silica-alumina cracking base. Such catalysts are quite sensitive to the presence of nitrogen in the feed and, especially at low temperatures, become rapidly deactivated thereby. Because of this sensitivity, these hydrocracking catalysts were limited for use with feeds containing less than 100 p.p.m. of nitrogen and, more typically, feeds containing less than 10 p.p.m. nitrogen. In many cases, it was even necessary to limit the nitrogen content of the feed to about 1 p.p.m. Since most hydrocarbon feeds contained more than enough nitrogen to deactivate the hydrocracking catalyst, it was necessary to denitrogenate the feed prior to introducing it into the hydrocracking zone. Suitable conditions for catalytic denitrogenation are elevated temperatures and pressures, the presence of hydrogen gas, and a denitrogenation catalyst such as one comprising a Group VI metal and a Group VIII metal on a porous, solid cracking support. The combination of this catalytic denitrogenation and the hydrocracking when taken collectively is commonly referred to as a two-stage hydrocracking process.

Somewhat recent developments in the area of hydrocracking catalysts have led to a one-stage hydrocracking process using a hydrocracking catalyst that is relatively insensitive to the presence of nitrogen and ammonia. This hydrocracking catalyst generally comprises a crystalline aluminosilicate, molecular sieve cracking base and one or more hydrogenation promoters. Such molecular sieves are often referred to as zeolites and are becoming extremely important as hydrocarbon conversion catalyst bases. The crystalline aluminosilicate found to be most effective for use in hydrocracking catalysts are characterized by having silica-alumina ratios of about 3 and by having a relatively uniform crystalline pore diameter of between about 6 and 14 A. Hydrogenation promoters used with these crystalline aluminosilicates include the Group VI and Group VIII metals and their oxides and sulfides.

Various important differences exist between the one-stage hydrocracking process and the two-stage hydrocracking processes. The catalyst used in the one-stage process is much more active with respect to nitrogen-containing feeds than that of the two-stage process and because of such tolerance to nitrogen and ammonia has a longer useful life. Along with this, the process equipment costs for the one-stage process are usually less than that of the two-stage process and these factors account for the capital investment generally being less for a one-stage hydrocracking process unit than that for an equivalent two-stage hydrocracking process unit. On the other hand, it has been found that the product selectivity of the two-stage process is better than that of the one-stage process so that in usual refinery situations, the value of product from the two-stage hydrocracking process is significantly greater. The one-stage process makes a larger percentage of light ends ($C_1$–$C_5$), although the $C_6+$ product of the one-stage process is the more aromatic. I have developed a novel hydrocracking process which combines many of the features of the single-stage and two-stage hydrocracking processes in order to provide both optimum product selectivity and feed conversion.

SUMMARY OF THE INVENTION

My invention is directed to a hydrocracking process involving multiple catalytic zones. More specifically, my invention involves the use of three catalytic zones, the first zone including a conventional acid-type hydrocracking catalyst such as that found in the second stage of a two-stage hydrocracking process. The second zone includes a denitrogenation catalyst such as that found in the first stage of a two-stage hydrocracking process. Finally, the third zone includes a molecular sieve-type hydrocracking catalyst such as that found in the one-stage hydrocracking process. The hydrocarbon feed and hydrogen gas are introduced into the second zone where the hydrocarbon is denitrogenated. The denitrogenated hydrocarbon is partially hydrocracked in the third zone to produce a relatively aromatic product. This product is separated into a heavy liquid fraction and a light liquid fraction, the light fraction being withdrawn as product. The heavy liquid fraction is recycled to the first zone for additional hydrocracking and the hydrocracked product is combined with fresh hydrocarbon feed and hydrogen to the second zone. In addition, gaseous effluent from the third zone is recycled to any of the three zones in order to provide the necessary hydrogen gas and to provide control of the catalyst temperatures. By varying the proportion of catalyst in each of the three zones and by controlling the reaction conditions, including the amount of recycle in the three zones, it is possible to adjust the product selectivity over a wide range and still maintain relatively high hydrocarbon feed conversions and long catalyst life. Although this disclosure is couched in terms of zones or catalytic zones, it is intended that each zone may comprise one or more fixed catalyst beds or fluidized catalyst beds. Furthermore, although the specific example discloses a single hydrocracking reactor, it is clear that each of the catalytic zones could be contained in a separate vessel.

BRIEF DESCRIPTION OF THE DRAWING

The figure is a schematic flow diagram of a multizone hydrocracking process having three catalyst zones, each consisting of a single catalyst bed and all contained within a single reaction vessel.

BRIEF DESCRIPTION OF THE INVENTION

In accordance with this invention, it has been found that high boiling hydrocarbon such as petroleum distillates boiling above about 300° F. and, preferably, having an initial boiling point of at least 350° F. may be catalytically cracked in the presence of hydrogen gas to obtain lower boiling hydrocarbons by contacting the high boiling hydrocarbons under hydrocracking conditions of elevated temperatures and pressures using a unique combination of multiple catalytic zones. The catalyst used in zones 1 and 3 of this invention are primarily hydrocracking catalysts and the catalyst used in zone 2 of this invention is primarily a denitrogenation catalyst.

Briefly, the invention involves a novel sequence by which the hydrocarbon is passed through the various catalytic zones. In the first zone, the hydrocracking takes place in the presence of an acid-type nitrogen-sensitive catalyst. In the second zone, denitrogenation takes place, and in the third zone, hydrocracking takes place in the presence of a relatively nitrogen-insensitive molecular sieve-type catalyst. The critical aspect of the invention is that the fresh hydrocarbon feed is not introduced into the first zone but rather is introduced with the fresh hydrogen gas into the second zone where it is denitrogenated. The denitrogenated hydrocarbon is then partially hydrocracked in the third catalytic zone and the hydrocracked effluent is separated into a heavy fraction and a light fraction. The light fraction is taken off as product and the heavy fraction is recycled to the first zone for further hydrocracking. Hydrocracked effluent from the first zone is mixed with fresh hydrocarbon feed and fresh hydrogen gas and this mixture is then introduced into the second zone for denitrogenation. Effluent from the third zone is treated for removal of gaseous sulfur- and ammonia-containing compounds and the treated gas is recycled to the various catalytic zones to provide necessary hydrogen gas and to control catalyst temperatures within the zones.

The hydrocracking catalyst of the first zone comprises a Group VIII hydrogenation component dispersed or otherwise associated with a solid acid-type cracking base such as silica-alumina or silica-magnesia. In the second catalytic zone, the catalyst can be any good denitrogenation catalyst such as nickel-molybdenum on alumina, cobalt-molybdenum on alumina or nickel tungsten sulfide on fluorided silica-alumina. The denitrogenation catalyst should contain both a Group VI and Group VIII hydrogenation promoter on a porous support. In the third zone, the hydrocracking catalyst is of the molecular sieve-type and includes catalysts containing Group VIII metals alone or Group VI and Group VIII metal as hydrogenation components on large pore, Y-type crystalline aluminosilicates dispersed in silica-alumina.

A catalyst which is preferred for use in the first zone comprises arsenated nickel on fluorided silica-alumina. This catalyst and others of the same type which may be used in accordance with the invention are fully described in U.S. Pat. 3,206,391, which issued Sept. 14, 1965. It may be prepared by soaking 25 g. of 20–48 mesh high alumina-silica-alumina cracking catalyst (containing about 25 weight percent alumina) in an ammoniacal solution of nickel acetate tetrahydrate for a period of about one hour. The impregnated catalyst is dried at 400° F. and calcined for 4 hours at 1000° F. The nickel-containing composite is then impregnated with an aqueous mixture containing 0.8 g. $As_2O_3$ in 30 percent $H_2O_2$ and 1.5 g. $NH_4F$. It is then dried and calcined as described above, the final catalyst containing about 9.4 weight percent nickel, 2.4 weight percent arsenic and 3 weight percent fluorine. The denitrogenated catalyst of the second zone comprises a sulfur-resistant hydrogenation catalyst which serves to break the carbon-nitrogen bonds in order to facilitate the removal and conversion of nitrogen to ammonia. Any of the sulfactive hydrogenation catalysts may be used, but preferred denitrogenation catalysts contain one or more of the oxides or sulfides of the transition metals such as cobalt, molybdenum, nickel or tungsten. These catalysts may be unsupported, but preferably they are dispersed on various porous or weakly acidic supports. Exemplary supports include silica, charcoal, kieselguhr, fuller's earth, titania, zirconia, bauxite, magnesia, or preferably, alumina. Particularly desirable catalysts are: (1) molybdenum trioxide catalyst promoted by a minor amount of cobalt oxide and supported on activated alumina, (2) tungsten sulfide on activated alumina, (3) molybdenum sulfite catalyst promoted by a minor amount of nickel sulfide on activated alumina, and (4) nickel tungsten sulfide on fluorided silica alumina.

A molecular sieve-type hydrocracking catalyst similar to that described in application S.N. 616,876 is used in the third catalytic zone of this invention. This catalyst comprises cobalt oxide and molybdenum trioxide deposited on, or dispersed in, a co-catalytic support of silica-alumina cracking catalyst and containing between about 5 and 50 weight percent, based on the total catalyst support, of ultrastable, large pore, crystalline alumino-silicate material. The preferred catalyst contains about 2.5 weight percent cobalt oxide, 5 weight percent molybdenum trioxide and about 35 weight percent of the ultrastable, large pore, crystalline alumino-silicate material. Various other molecular sieve catalysts such as those described in U.S. Pats. 2,971,904; 3,326,761; 3,236,762 and 3,269,934 could also be used in the third zone of this invention.

Referring now to the drawing, reactor 10 contains three catalyst beds 11, 12, and 13 corresponding to the three catalytic zones referred to above. Catalyst bed 11 contains an acid-type hydrocracking catalyst comprising arsenated nickel on fluoride silica-alumina. Catalyst bed 12 contains a denitrogenation catalyst comprising molybdenum trioxide and cobalt supported on activated alumina. Catalyst bed 13 contains a molecular sieve-type hydrocracking catalyst comprising molybdenum trioxide and cobalt oxide dispersed on a silica-alumina support which includes about 35 weight percent large pore, ultrastable, crystalline alumino-silicate material. Outlet line 15 of reactor 10 communicates with heat exchanger 14 used for cooling effluent from reactor 10. A high pressure separator 16 accepts cooled effluent from heat exchanger 14 and separate this effluent into a gaseous phase which is recycled back to reactor 10 and a liquid phase which is fractionated in column 17 into a light product stream and a heavy recycle stream which is fed to catalyst bed 11. Specifically, a fresh feed including a light catalytic cycle oil (400–650° F. ASTM boiling range) and fresh hydrogen gas from source 18 is introduced into reactor 10 via line 19 at a point between catalyst beds 11 and 12. The fresh feed is passed to catalyst bed 12 under reaction conditions whereby most of the organic nitrogen and sulfur are converted to ammonia and hydrogen sulfide gases and whereby the nitrogen content of the hydrocarbon material from bed 12 is reduced to a level between about 0.5 and 200 p.p.m. Effluent from bed 12 is passed to catalyst bed 13 under conditions such that between about 30 and 77 percent of the material passing therethrough is hydrocracked. The resulting product from catalyst bed 13 contains a highly aromatic, heavy naphtha material. This material leaves reactor 10 via line 15 and is mixed with water from line 21 to scrub out ammonia, ammonium sulfide and ammonium chloride. From line 15, the material is sent to heat exchanger 14 where it is cooled and the cooled material goes from heat exchanger 14 to high pressure separator 16 via line 20. The feed to separator 16 is divided into an ammonia-water phase, a liquid hydrocarbon phase, and a hydrogen-rich gaseous phase. The ammonia-water phase is removed via line 22 and the hydrogen-rich gas phase is recycled to reactor 10 via line 23 and line 24. Provisions are made for allowing a portion of the gas to be introduced into reactor 10 below catalyst bed 11 via lines 25 or 26. Introduction of the recycle gas in such a manner provides a means of controlling the reaction temperature in reactor 10. Liquid hydrocarbon is sent to column 17 via line 27 and the hydrocarbon is fractionated therein into at least a high-boiling fraction and a low boiling fraction. The low-boiling fraction is taken off as product via line 28 while the high-boiling fraction is recycled back to reactor 10 via line 29. In general, the gasoline and lighter materials are withdrawn as product from line 28, whereas the heavier, unconverted hydrocarbon is recycled to reactor 10. Conditions in catalyst bed 11 are such that the cracked product contains only a low gas yield and the heavy naphtha product is relatively low in aromatics. Effluent from catalyst bed 11 is mixed with fresh feed entering reactor 10 from line 19 and the mixture of heavy naphtha and fresh feed is denitrogenated in catalyst bed 12.

Process conditions in the three catalyst beds are individually controlled to give an optimum gasoline product from any feed stream. The conditions in the three catalytic zones should be within the following ranges:

| | |
|---|---|
| Fresh feed space velocity, v./h./v. | 0.3–10 |
| Hydrogen pressure, p.s.i. | 500–2500 |
| Hydrogen recycle M s.c.f.b. of total oil feed | 1–20 |
| Temperature, °F. | 450–850 |
| Through put ratio, v./v. | 1.0–2.0 |

In the foregoing examples, the three catalyst beds correspond to the three catalyst stages or zones and all are in a single hydrocracking reactor. This combination of multiple beds in a single vessel is merely for convenience and it is evident that each bed could have been placed in a separate reactor to permit better control of process conditions in each catalyst bed. Furthermore, the example was limited to a fixed-bed system, but it is clear that other types of catalyst systems may be desirable. In addition, each catalytic zone can be comprised of a plurality of catalyst beds. While the present invention has been described with reference to a specific process example, it is evident that variations in the method of practicing the invention, including the use of specific catalysts other than those mentioned herein, would be apparent from the foregoing description to the skilled artisan. It is to be understood that such variations fall within the spirit and scope of the present invention.

I claim:

1. A process for hydrocracking and denitrogenating a hydrocarbon feed stock which boils above 300° F. and which contains organic nitrogen, using three sequential catalytic zones, comprising:

(a) passing said feed stock through a second catalytic zone, said zone containing a denitrogenation catalyst, wherein said feed stock is contacted with said denitrogenation catalyst under conditions of temperature and hydrogen pressure so that the resulting effluent from said second catalytic zone contains less than about 200 p.p.m. of organic nitrogen;

(b) passing the effluent from said second catalytic zone through a third catalytic zone containing a molecular sieve-type hydrocracking catalyst, wherein said second catalytic zone effluent is contacted with said molecular sieve-type hydrocracking catalyst under conditions of temperature and hydrogen pressure so that at least some effluent from said third catalytic zone has been hydrocracked in said third catalytic zone;

(c) recycling a portion of effluent from said third catalytic zone and passing said recycled portion through a first catalytic zone, said zone containing an acid-type hydrocracking catalyst, wherein said recycle portion is contacted with said acid-type hydrocracking catalyst under conditions of temperature and hydrogen pressure so that a substantial part of said recycle portion is hydrocracked in said first catalytic zone; and (d) introducing the entire effluent from said first catalytic zone into said second catalytic zone so that said first catalytic zone effluent is mixed with feed stock and undergoes further denitrogenation in said second catalytic zone along with said feed stock.

2. The process of claim 1 wherein said third catalytic zone effluent is treated to reduce the level of ammonia and ammonium compounds, is cooled below its initial boiling point and separated into a hydrogen-rich gas phase and a liquid hydrocarbon phase, and some of the hydrogen-rich gas is recycled to at least one of said three catalytic zones, the liquid hydrocarbon phase being separated into a high boiling fraction and a low boiling fraction, at least some of said high boiling fraction being recycled to said first catalytic zone.

3. The process of claim 2 wherein temperatures in said catalytic zones are between about 450° F. and about 800° F. hydrogen pressures in said catalytic zones are between about 500 p.s.i. and 2500 p.s.i., and wherein the space velocities, based on fresh feed and total catalyst loading are between about 0.3 and 10.0 vol./hr./vol. and the hydrogen-rich gas is recycled at a rate between about 1 and 20 M s.c.f.b. on total oil feed.

4. The process of claim 2 wherein said first catalytic zone hydrocracking catalyst comprises a Group VIII hydrogenation promoter on a solid acid-type porous cracking base.

5. The process of claim 2 wherein said first catalytic zone hydrocracking catalyst comprises a Group VI hydrogenation promoter and a Group VIII hydrogenation promoter on a solid acid-type cracking base.

6. The process of claim 2 wherein said second catalytic zone denitrogenation catalyst is a sulfur-resistant hydrogenation catalyst comprising a suitable support and at least one component selected from the group consisting of Group VI metals and compounds thereof and at least one component selected from the group consisting of Group VIII metals and compounds thereof.

7. The process of claim 6 wherein said support is activated alumina.

8. The process of claim 6 wherein said support is silica-magnesia.

9. The process of claim 6 wherein said support is fluorided silica-alumina.

10. The process of claim 2 wherein said third catalytic zone catalyst comprises a hydrogenation promoter selected from the group consisting of the Group VI metals and compounds thereof and at least one component selected from the group consisting of the Group VIII metals and compounds thereof, said hydrogenation promoter dispersed on a crystalline aluminosilicate Y-type molecular sieve and supported on a silica-alumina cracking base.

11. The process of claim 2 wherein said third catalytic zone catalyst comprises a hydrogenation promoter selected from the group consisting of the Group VIII metals and compounds thereof, said promoter dispersed on a crystalline aluminosilicate Y-type molecular sieve and supported on a silica-alumina cracking base.

12. The process of claim 2 wherein said first catalytic zone hydrocracking catalyst comprises arsenated nickel on fluorided silica-alumina, said second catalytic zone denitrogenation catalyst comprises molybdenum trioxide and cobalt oxide supported on activated alumina, and said third catalytic zone hydrocracking catalyst comprises cobalt oxide and molybdenum trioxide dispersed in a cocatalytic support of silica-alumina cracking catalyst containing between about 5 and 50 weight percent of large pore, crystalline aluminosilicate material.

References Cited

UNITED STATES PATENTS

| | | | |
|---|---|---|---|
| 2,971,901 | 2/1961 | Halik et al. | 208—59 |
| 3,239,447 | 3/1966 | Reeg et al. | 208—59 |
| 3,240,694 | 3/1966 | Mason et al. | 208—59 |
| 3,256,177 | 6/1966 | Tulleners et al. | 208—89 |
| 3,260,663 | 7/1966 | Inwood et al. | 208—59 |
| 3,385,781 | 5/1968 | Hamner et al. | 208—59 |

DELBERT E. GANTZ, Primary Examiner

R. BRUSKIN, Assistant Examiner

U.S. Cl. X.R.

208—59